(12) United States Patent
Grossman et al.

(10) Patent No.: US 8,533,392 B2
(45) Date of Patent: Sep. 10, 2013

(54) CACHE HIT MANAGEMENT

(75) Inventors: Adi Grossman, Holon (IL); Omri Shacham, Mitzpe Ramon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 12/397,895

(22) Filed: Mar. 4, 2009

(65) Prior Publication Data

US 2010/0228921 A1    Sep. 9, 2010

(51) Int. Cl.
*G06F 12/00*    (2006.01)
*G06F 13/00*    (2006.01)
*G06F 13/28*    (2006.01)

(52) U.S. Cl.
USPC ............ 711/118; 711/117; 711/122; 712/207

(58) Field of Classification Search
USPC .................... 711/122, 117, 118; 712/207
See application file for complete search history.

(56) References Cited

U.S. PATENT DOCUMENTS

| | | | |
|---|---|---|---|
| 5,649,156 A * | 7/1997 | Vishlitzky et al. | 711/136 |
| 6,453,389 B1 * | 9/2002 | Weinberger et al. | 711/137 |
| 7,865,514 B2 * | 1/2011 | Idei et al. | 707/758 |
| 2002/0007443 A1 * | 1/2002 | Gharachorloo et al. | 711/141 |
| 2005/0144605 A1 | 6/2005 | Motokawa et al. | |

* cited by examiner

*Primary Examiner* — Stephen Elmore
*Assistant Examiner* — Mark Giardino, Jr.
(74) *Attorney, Agent, or Firm* — Chun-Liang Kuo

(57) ABSTRACT

A system and method for cache hit management.

20 Claims, 6 Drawing Sheets

Data with non-linear structure

Pieces of data on Subset K

Pieces of data on Subset K

Prefetch in Forward

Cache Memory

Additional Cache Memory

Process in Reverse Order

Cache Memory

Additional Cache Memory

CACHE HIT MANAGEMENT

BACKGROUND

The processing of data or pieces of data conventionally involves a processor accessing and loading the data or pieces of data directly from a main memory as needed. The processor may stall while it waits for data or pieces of data from main memory. Alternatively the processor may utilize a faster and smaller cache memory to store frequently used data. Conventionally, as new data or pieces of data are prefetched into the cache following an order, existing data or pieces of data that may later be requested by the processor are concurrently evicted out of the cache following the order resulting in cache misses.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by utilizing an alternating pattern when prefetching data or pieces of data onto cache memory and when processing data or pieces of data from the cache memory. A common practice for conventional prefetching and processing data or pieces of data onto and from cache is to prefetch and process the data or pieces of data following the same direction or order. As a result, a processor may frequently miss matching pieces of data that the processor may request to process since data or pieces of data may have recently have been evicted from the cache memory onto an additional level of cache memory or out of the cache memory. In addition, the processor may have unproductive clock cycles processing non-matching data or pieces of data and incur additional clock cycles when fetching the data or pieces of data from main memory. The present invention alleviates many of the burdens of the processor by prefetching each piece of a subset of data following a first order and then processing each piece of the subset of data following a second order that is opposite of the first order.

Figure 1:
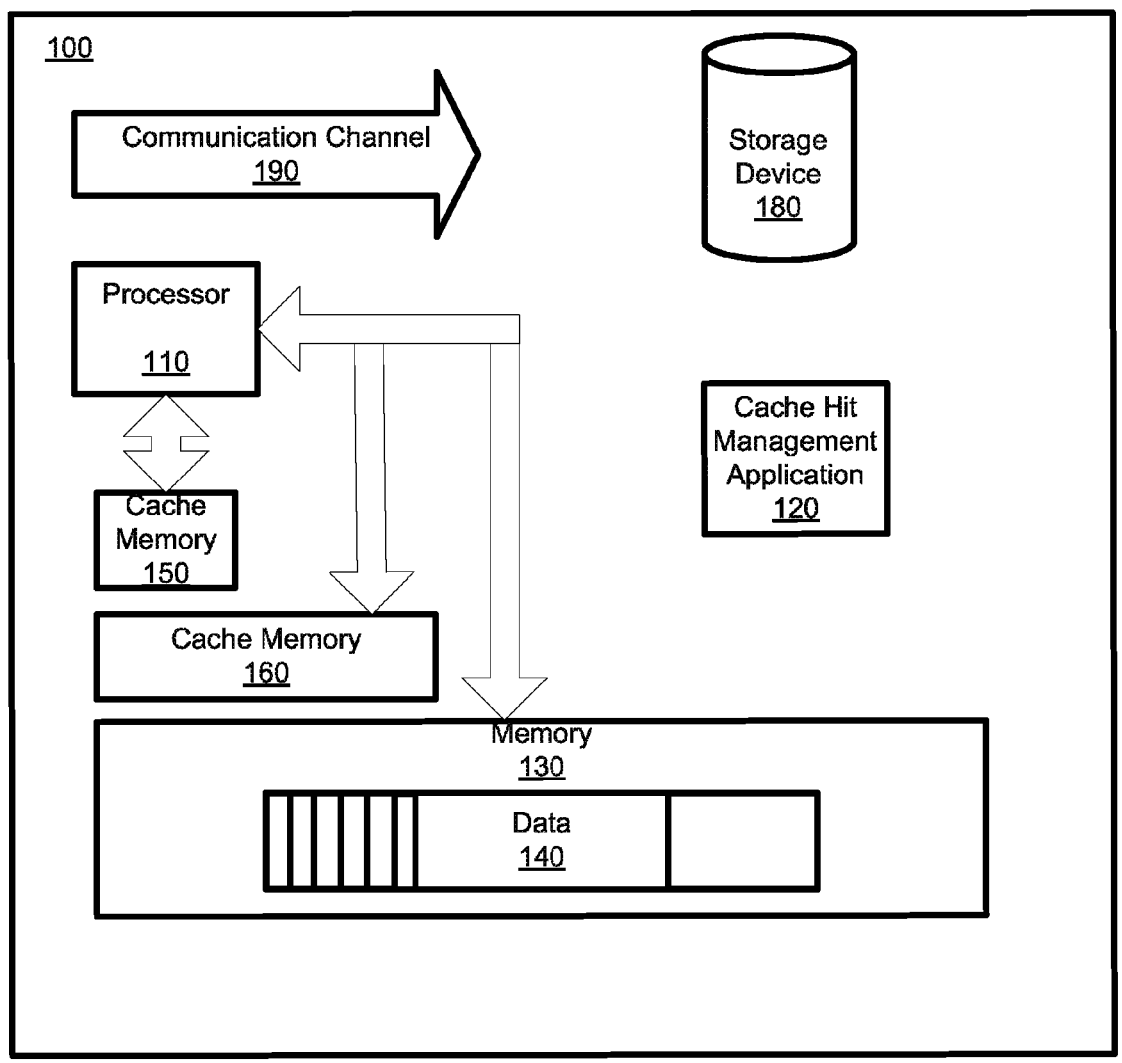
FIG. 1 illustrates a system with at least one level of cache memory prefetching a subset of data from memory for a processor according to an embodiment of the invention.

FIG. 1 illustrates a system with at least one level of cache memory prefetching a subset of data from memory for a processor according to an embodiment of the invention. The system may be a desktop, a laptop, a server, and/or any device that many execute instructions and/or process data using one or more processors. Additionally, as illustrated in FIG. 1, the system may include a processor, at least one level of cache memory, main memory, a cache hit management application, a storage device, and a communication channel for the system and/or one or more components of the system to communicate with one another. The system may include additional components and/or may be coupled to additional components in addition to and/or in lieu of those noted above and illustrated in FIG. 1.

As illustrated in FIG. 1, a system 100 may include a processor 110 coupled to the system 100. The processor 110 may be a microprocessor that includes one or more cores that may execute instructions and/or process data from the system 100 or another device accessible by the system 100. Additionally, the processor 110 may be coupled to and access data and/or instructions from main memory 130, and at least one level of cache memory 150, 160, through a communication channel 190. In one embodiment, the communication channel 190 may be a processor bus or a memory bus. As noted above, the processor 110 may be coupled to and access main memory 130. Main memory 130 may be used to store executable instructions and/or data. Additionally, main memory 130 may be random access memory and may vary in size and/or speed based on a hardware configuration of the system 100. The hardware configuration of the system may include the genre or model of the processor 110 as well as the genre or model of main memory 130. Main memory 130 may further store subsets of data which may be accessed by the processor 110.

Additionally, as noted above, the processor 110 may be coupled to and access at least one level of cache memory 150, 160. At least one cache memory may include a first level of cache memory 150 and an additional level of cache memory 160. Further at least one level of cache memory 150, 160 may be a data cache which may include physical memory to temporarily store copies of data from main memory 130. Additionally, at least one level of cache memory 150, 160 may be closer to the processor 110 than main memory 130. Further, at least one level of cache memory 150, 160 may have a faster access and write speed than main memory 130. In one embodiment, the first level of cache memory 150 may be a level 1 (L1) cache and the additional level of cache memory may be a level 2 (L2) cache. The first level of cache memory 150 may be smaller than the additional level of cache memory 160, but may be closer to the processor 110 and faster than the additional level of cache memory 160. Additionally, the additional level of cache memory 160 may be farther and slower than the first level of cache memory 150, but it may have a larger capacity than the first level of cache memory 150. Further, the system 100 may further include additional caches and/or additional levels of cache memory, such as an instruction cache to fetch executable instructions for the processor 110 and/or a level 3 (L3), which may have a greater capacity than the additional level of cache memory 160 but also be slower than the additional level of cache memory 160.

Further, as noted above, the system 100 may include a cache hit management application 120. The cache hit management application 120 may manage the fetching and prefetching of at least one subset of data from main memory 130 to at least one level of cache memory 150, 160. Data 140 may include characters, numbers, images, and/or other symbols that may be recognized by the system 100 and processed by the processor 110. A subset of data may be a collection of data that includes characters, numbers, images, and/or other symbols from the data 140, but may not include every piece of the data 140. The subset of data may further include a linear data structure or a non-linear data structure. The cache hit management application 120 may create and manage the subsetting of data 140 from main memory 130 to at least one level of cache memory 150, 160 by splitting and/or transforming data 140 into one or more subsets. The subset of data may be of a fixed size which may be previously defined by a user or based on the hardware configuration of the system 100. Further, the cache hit management application 120 may manage the processing of a piece of data from the subset of data in at least one level of cache memory 150, 160 by the processor 110.

The cache hit management application 120 may be firmware that is embedded onto the system 100. Additionally, the cache hit management application 120 may be a software application stored on the system 100 within ROM or on a storage device 180 accessible by the system 100 or the cache hit management application 120 may be stored on a computer readable medium readable and accessible by the system 100 from a different location. Further, the cache hit management application 120 may be stored and/or accessed through a server coupled through a local area network or a wide area network. The cache hit management application 120 may communicate with other additional devices and/or components coupled to the system 100 physically or wirelessly through one or more communication channels 190 included in or attached to the system 100. In one embodiment, the cache hit management application 120 may be a compiler on the system 100 that may manage a storing and processing of at least one subset of data on at least one level of cache memory 150, 160. In another embodiment, the cache hit management application 120 may be an application that may have access to a compiler on the system 100 to send and/or modify instructions on the compiler.

As noted above, the cache hit management application 120 may manage the prefetching and fetching of each piece of data. In prefetching each piece of data, the cache hit management application 120 may anticipate what data 140 or pieces of data may later be needed by the processor 110 and load the data 140 or pieces of data accordingly onto at least one level of cache memory 150, 160. Additionally, in anticipating what data 140 or pieces of data the processor 110 may later request to process, the cache hit management application 120 and/or the compiler may analyze a data usage characteristic of the processor 110. A data usage characteristic of the processor 110 may be what data 140 typically is also requested to be processed when the processor 110 is currently processing a piece of data. In one embodiment, this may include the cache hit management application 120 identifying at least one piece of data that may sequentially follow or precede a currently processed piece of data. A currently processed piece of data is a piece of data that the processor 110 is currently requesting to access and process. The cache hit management application 120 may utilize additional means and/or analysis in anticipating what data 140 or pieces of data may later be requested by the processor 110.

After identifying at least one piece of data that may sequentially follow or precede a currently processed piece of data, the cache hit management application 120 may create at least one subset of data by subsetting the data 140 based on a hardware configuration of the system 100. At least one subset of data may include a subset of data and an additional subset of data. As noted above, the size of the subset of data may be previously defined based on the hardware configuration of the system 100. In subsetting the data 140, the cache hit management application may continue to split and/or transform the data 140 into one or more subsets of data until all of the information from the data 140 is included in one or more subsets of data. One or more subsets of data may include a matching piece of data that the processor 110 will later request to process. After one or more subset of data has been created from the data 140, in one embodiment, the cache hit management application may proceed to add a new set of instructions or modify an existing set of instructions to prefetch and/or fetch each piece of the subset of data following a first order and process each piece of the subset of data following a second order that is opposite of the first order. As noted above, in one embodiment, the cache hit management application 120 may be a compiler for the system that may create and/or modify instructions and in another embodiment, the cache hit management application may be an application that may communicate with a compiler on the system 100 to create or modify instructions on the compiler.

The processor 110 may read and execute these instructions from the compiler to fetch each piece of the subset of data following a first order and process each piece of the subset of data following a second order that is opposite of the first order. In one embodiment, the fetching of each piece of the subset of data following a first order may include accessing and loading a last piece of the subset of data before accessing and loading a first piece of the subset of data onto at least one level of cache memory 150, 160. The compiler may initially fetch the last piece of the subset of data onto at least one level of cache memory 150, 160. The compiler may then proceed to fetch the preceding piece of the subset data before the last piece of the subset of data onto at least one level of cache memory 150, 160. The compiler may continue to fetch each preceding piece of the subset of data onto at least one level of cache memory 150, 160 until it has fetched the first piece of the subset of data and as a result, each piece of the subset of data.

Additionally, in one embodiment, the cache hit management application 120 and/or the compiler may utilize a write policy that concurrently writes and stores each piece of the subset of data that was fetched onto at least one level of cache memory 150, 160 onto main memory 130. Alternatively, the cache hit management application 120 and/or the compiler may utilize a write policy that writes and stores each piece of the subset of data that was fetched onto at least one level of cache memory 150, 160 onto main memory 130 after the pieces of the subset of data have been evicted. The cache hit management application 120 and/or the compiler may utilize additional write policies in writing each piece of the subset of data that has been fetched onto at least one level of cache memory 150, 160 onto main memory 130 in addition to and/or in lieu of those noted above.

After each piece of the subset of data has been fetched onto at least one level of cache memory 150, 160, the cache hit management application 120 and/or the compiler may identify when the processor requests to process a matching piece of data and execute an instruction for the processor 110 to process each piece of the subset of data on at least one level of cache memory 150, 160 following a second order that is opposite of the first order. The matching piece of data may be a piece of data that was previously prefetched and may be included in the prefetched subset of data that the processor 110 is currently requesting to process. In one embodiment, the processor 110 may initially process the first piece of the subset of data before processing the last piece of the subset of data on at least one level of cache memory 150, 160. The processor 110 may then continue to process a following piece of the subset of data after processing the first piece of the subset of data. The processor 110 may then proceed to process each following piece of the subset data on at least one level of cache memory 150, 160 until it has processed the last piece of the subset of data and as a result, each piece of the subset of data.

While processing each piece of the subset of data, the cache hit management application 120 and/or the compiler may determine whether the processor 110 has processed the matching piece of data. If the matching piece of data was requested and processed from the subset of data on at least one level of cache memory 150, 160 by the processor 110, then a cache hit will have occurred. A cache hit occurs when the processor 110 processes a matching piece of data from at least one level of cache memory 150, 160. After a cache hit has occurred, the processor 110 may continue to process each piece of the subset of data following the second order for additional matching pieces of data to obtain additional cache hits. If the matching piece of data was requested but was not processed from at least one level of cache memory 150, 160, then a cache miss will have occurred and the processor may fetch the matching piece of data from main memory 130.

After each piece of the subset of data has been processed by the processor 110, the cache hit management application 120 and/or the compiler may proceed to access and load an additional subset of data onto at least one level of cache memory 150, 160 following the first order that is opposite of the second order. The cache hit management application 120 and/or the compiler may then continue to identify when the processor 110 requests to process a matching piece of data and execute an instruction for the processor 110 to process each piece of the subset of data following a second order that is opposite of the first order.

When accessing and loading an additional subset of data after a cache miss, in one embodiment, the compiler frequently may follow a least recently used replacement policy in issuing an instruction to evict at least one piece of the subset of data from the first level cache memory 150 to the additional level of cache memory 160 or out of the first level of cache memory 150 and into main memory 130. Additionally, the compiler may issue an instruction to evict at least one piece of the subset of data out of the additional level of cache memory 160 and into main memory 130. The compiler may utilize additional replacement policies in addition to and/or in lieu of those noted above in the writing of at least one piece of the subset of data onto main memory 130 when at least one piece has been evicted.

Figure 2:
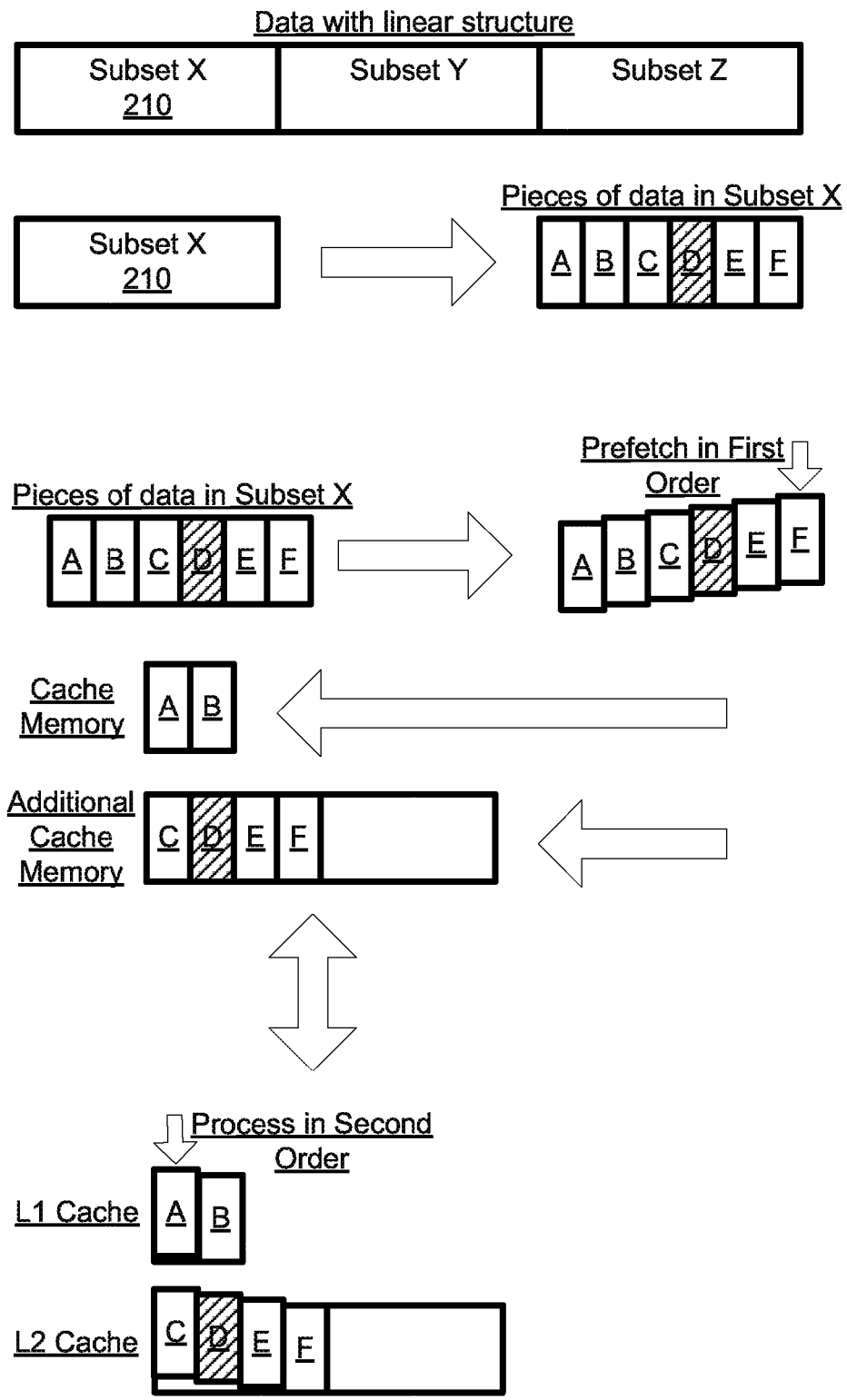
FIG. 2 illustrates a cache hit management application subsetting data and prefetching a subset of data following a reverse order and processing the data following a forward order according to an embodiment of the invention.

FIG. 2 illustrates a cache hit management application subsetting data and prefetching a subset of data following a reverse order and processing the data following a forward order according to an embodiment of the invention. As noted above, the cache hit management application may identify at least one piece of matching data that the processor may later request to process. Further, as illustrated in FIG. 2, the matching piece of data may be included in a subset of data that the cache hit management application creates by subsetting data. In the present embodiment, one or more subsets of data may have a linear data structure such as a linked list.

As illustrated in FIG. 2, the cache hit management application may subset the data into one or more subsets, utilizing a linked list as the data structure. One or more subsets may include subset X 210, subset Y, and subset Z. Additionally, subset X 210 may include multiple pieces of data. Subset X 210 may include pieces A, B, C, D, E, and F. Further, as illustrated in FIG. 2, subset X 210 may include a matching piece of data, D, and may have a word length of 6. Further, the first level of cache memory may support 2 words and the additional level of cache memory may support 8 words. After subset X 210 has been created by subsetting data, each piece of subset X 210 may be accessed and loaded into at least one level of cache memory following a reverse order. In one embodiment, this may include accessing and loading a last piece of subset X 210 onto at least one level of cache memory before accessing and loading a first piece of subset X 210 onto at least one level of cache memory.

As illustrated in FIG. 2, piece F is the last piece of subset X 210. As a result, piece F will be the first piece of subset X 210 to be accessed and loaded onto the first level of cache memory by the cache hit management application. Piece E will next be accessed and loaded onto the first level of cache memory and join piece F on the first level of cache memory. Piece E and F will then fully occupy the first level of cache memory. The cache hit management application may then proceed to access and load piece D onto the first level of cache memory. Because the first level of cache memory may support 2 words and is currently full, at least one piece, F, may be evicted out of the first level of cache memory to make room for piece D using a replacement policy. In the present embodiment, piece F may be evicted out of the first level of cache memory and onto an additional level of cache memory. The cache hit management application may continue to access and load pieces C, B, and A onto at least one level of cache memory following the reverse order while evicting existing pieces onto the additional level of cache memory to make room for the new pieces.

After each piece of subset X 210 has been accessed and loaded onto at least one level of cache memory, the first level of cache memory may include pieces A and B, while the second level of cache memory may include pieces C, D, E, and F. Additionally, as noted above, after accessing each piece of the subset X 210 onto at least one level of cache memory, the processor may request to process matching piece D. The processor may then proceed to process each piece of the subset X 210 from at least one level of cache memory following a forward order. Further, as noted above, the forward order may include processing the first piece of subset X 210 on at least one level of cache memory before processing the last piece of subset X 210 on at least one level of cache memory.

As illustrated in FIG. 2, the cache hit management application may begin by processing piece A and then B on the first level of cache memory. Because A and B are not the matching piece of data that the processor has requested to process, cache misses will have occurred. After processing each piece on the first level of cache, the processor may then proceed to the additional level of cache memory and proceed to process each piece following the second order that is opposite of the first order. As illustrated in FIG. 2, the processor may begin to process piece C and then D. Because piece D is a matching piece of data that the processor requested to process a cache hit will have occurred. The processor may then proceed to process remaining pieces E and F to obtain additional cache hits.

In one embodiment, the cache hit management application may then proceed to access and load an additional subset of data onto at least one level of cache memory after each piece of the preceding set has been processed by the processor. Further, at least one piece of the previously processed subset may be evicted using one or more replacement policies.

Figure 3:
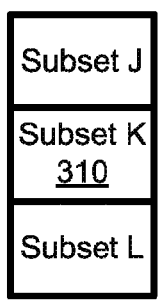
FIG. 3 illustrates a cache hit management application subsetting data and prefetching a subset of data following a first order and processing the data following a second order that is opposite of the first order according to an embodiment of the invention.
Figure 3:
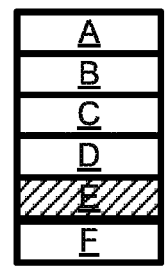
Figure 3:
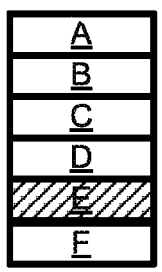
Figure 3:
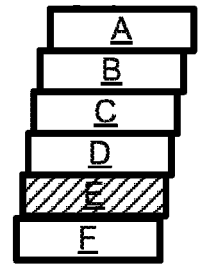
Figure 3:
Figure 3:
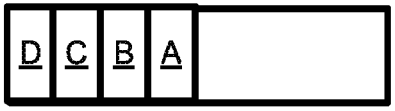
Figure 3:
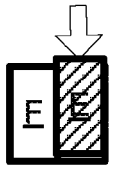
Figure 3:
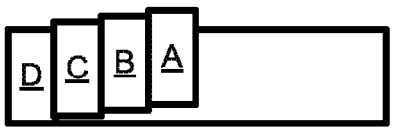

FIG. 3 illustrates a cache hit management application subsetting data and prefetching a subset of data following a first order and processing the data following a second order that is opposite of the first order according to an embodiment of the invention. In the present embodiment, one or more subsets of data may have a non-linear data structure. Similar to above and as illustrated in FIG. 3, a matching piece of data may be included in a subset of data that the cache hit management application creates by subsetting data.

Figure 5:
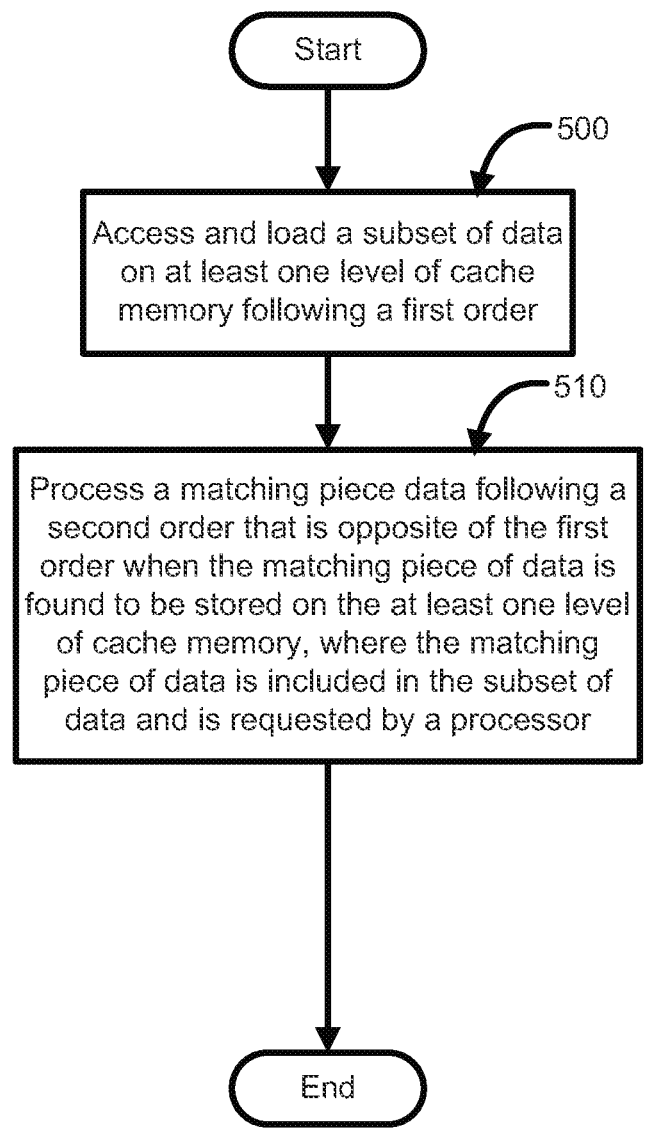
FIG. 5 is a flow chart illustrating a method for pretching a subset of data following a first order and processing the subset of data following a second order that is opposite of the first order according to an embodiment of the invention.

As illustrated in FIG. 3, the cache hit management application may subset the data into one or more subsets based on a hardware configuration, utilizing a non linear data structure. One or more subsets may include subset J, subset K 310, and subset L. Additionally, subset K 310 may include multiple pieces of data, pieces A, B, C, D, E, and F. Further, as illustrated in FIG. 3 5 subset K 310 may include a matching piece of data, E, and may have a word length of 6. Similar to above, the first level of cache memory may support 2 words and the additional level of cache memory may support 8 words. After, subset K 310 has been created, each piece of subset K 310 may be accessed and loaded onto at least one level of cache memory following a first order. In one embodiment, the first order may include accessing and loading a first piece of subset K 310 onto at least one level of cache memory before accessing and loading a last piece of subset K 310 onto at least one level of cache memory.

As illustrated in FIG. 3, piece A is the first piece of subset K 310. As a result, piece A will first be accessed and loaded onto the first level of cache memory by the cache hit management application. Piece B will next be accessed and loaded onto the first level of cache memory and join piece A on first level of cache memory. Pieces B and A will then fully occupy the first level of cache memory. The cache hit management application may then proceed to access and load piece C onto the first level of cache memory. Because the first level of cache memory may support 2 words and is currently full, at least one piece, A, may be evicted out of the first level of cache memory to make room for piece C. In the present embodiment, piece A may be evicted out of the first level of cache memory and onto an additional level of cache memory. The cache hit management application may continue to access and load pieces D, followed by E, and F onto at least one level of cache memory following the first order while evicting existing pieces onto the additional level of cache memory to make room for the new pieces as needed.

After each piece of subset K 310 has been accessed and loaded onto at least one level of cache memory, the first level of cache memory may include pieces F and E, while the additional level of cache memory may include pieces, D, C, B, and A. Additionally, as noted above, after accessing and loading each piece of subset K 310 onto at least one level of cache memory, the processor may request to process matching piece E. The processor may then proceed to process each piece of the subset K 310 from at least one level of cache memory following a second order that is opposite of the first order. Further, as noted above, the second order may include processing the last piece of subset K 310 on at least one level of cache memory before processing the first piece of subset K 310 on at least one level of cache memory.

As illustrated in FIG. 3, the cache hit management application may begin by processing piece E, since piece E is the last piece of subset K 310. Because E is the matching piece of data that the processor has requested to process, a cache hit will have occurred immediately. The processor may then continue to process the next piece on the first level of cache memory, F, to attempt to obtain additional cache hits. Because F is not a matching piece, a cache miss will have occurred. After processing each piece on the first level of cache, the processor may then proceed to the additional level of cache memory and proceed to process each piece following the second order that is opposite of the first order. As illustrated in FIG. 2, the processor may begin to process the last piece A, followed by B, then C, and then D to try to obtain additional cache hits.

Figure 4:
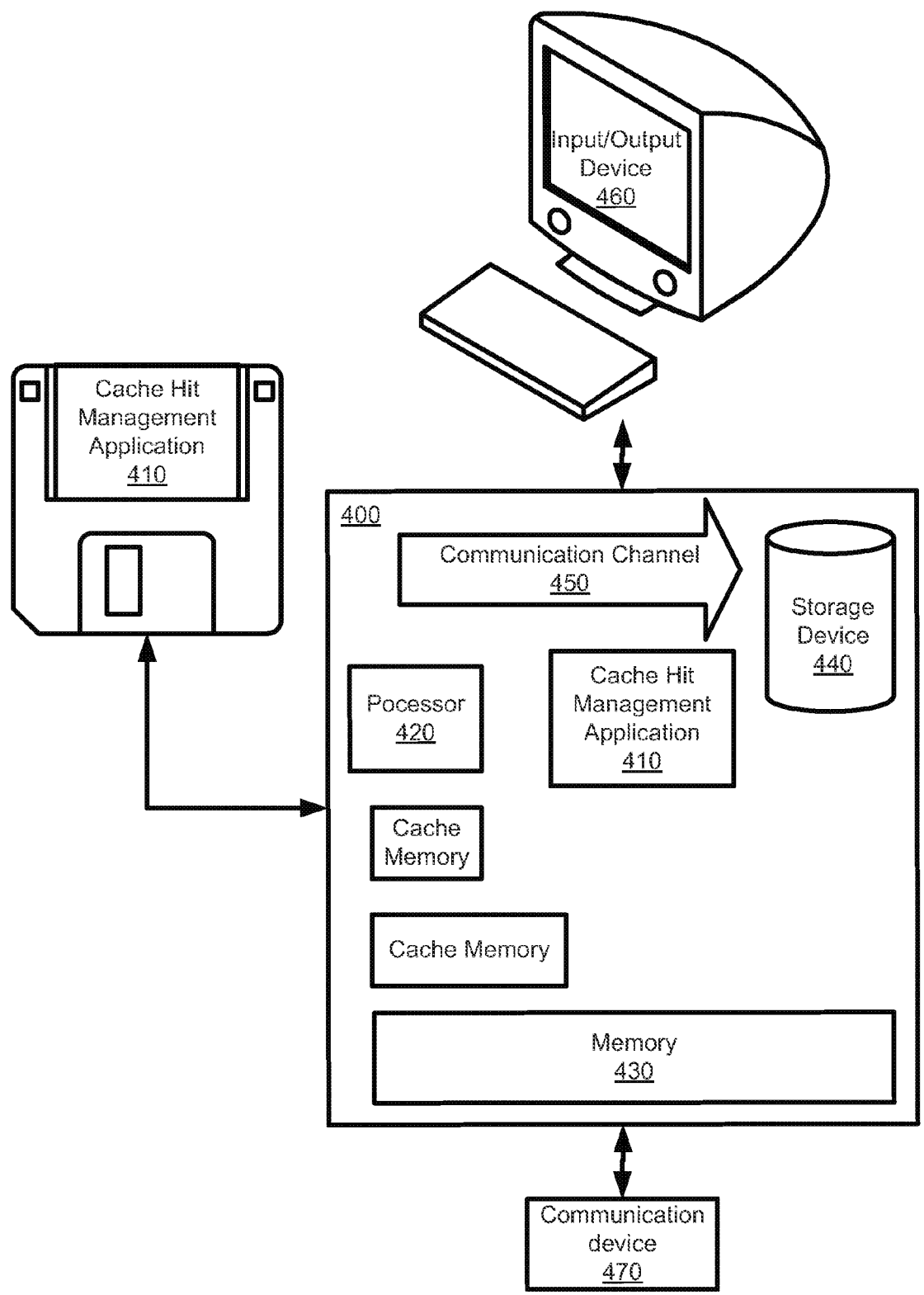
FIG. 4 illustrates a cache hit management application that may be embedded onto a system and/or may be stored on a removable medium being accessed by the system according to an embodiment of the invention.

FIG. 4 illustrates a cache hit management application that may be embedded onto a system and/or may be stored on a removable medium being accessed by the system according to an embodiment of the invention. For the purposes of this description, a removable medium may be any tangible apparatus that may contain, store, communicate, or transport the application for use by or in connection with the system. Additionally, as noted above, the cache hit management application 410 may be a compiler on the system or an application that may communicate and send instructions for the compiler to execute.

Further, as noted above, the cache hit management application 410 may be firmware that may be imbedded into one or more components of the system 400 as ROM. Additionally, the cache hit management application 410 may be a software application which may be stored and accessed from a hard drive, a compact disc, a flash disk, a network drive or any other form of computer readable medium that is coupled to the system 400. In one embodiment, the cache hit management application 410 may be stored on a server or another device that may be coupled to the system 400. The system 400 may utilize a local area network or a wide area network to store and access the gallery effects application 410. The cache hit management application 410 may be stored and accessed from additional devices in addition to and/or in lieu of those depicted in FIG. 4.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

FIG. 5 is a flow chart illustrating a method for pretching a subset of data following a first order and processing the subset of data following a second order that is opposite of the first order according to an embodiment of the invention. The method of FIG. 5 may utilize a processor, a memory coupled to the processor, data, at least one level of cache memory, and a cache hit management application. The method of FIG. 5 may utilize additional components and/or devices in addition to and/or in lieu of those noted above and illustrated in FIG. 1.

The cache hit management application may initially access and load a subset of data on at least one level of cache memory following a first order 500. As noted above, a first order may include accessing and loading a last piece of the subset of data before accessing and loading a first piece of the subset of data on at least one level of cache memory. After accessing and loading each piece of the subset of data, the cache hit management application may proceed to process a matching piece data following a second order that is opposite of the first order when the matching piece of data is found to be stored on the at least one level of cache memory and the matching piece of data is included in the subset of data and is requested by a processor 510. As noted above, processing the subset of data in a second order may include processing the first piece of the subset of data before proceeding to process the last piece of the subset of data.

The process may then be complete or the cache hit management application may proceed to attempt to obtain cache hits repeating the method disclosed in FIG. 5. The method of FIG. 5 may include additional steps in addition to and/or in lieu of those depicted in FIG. 5.

Figure 6:
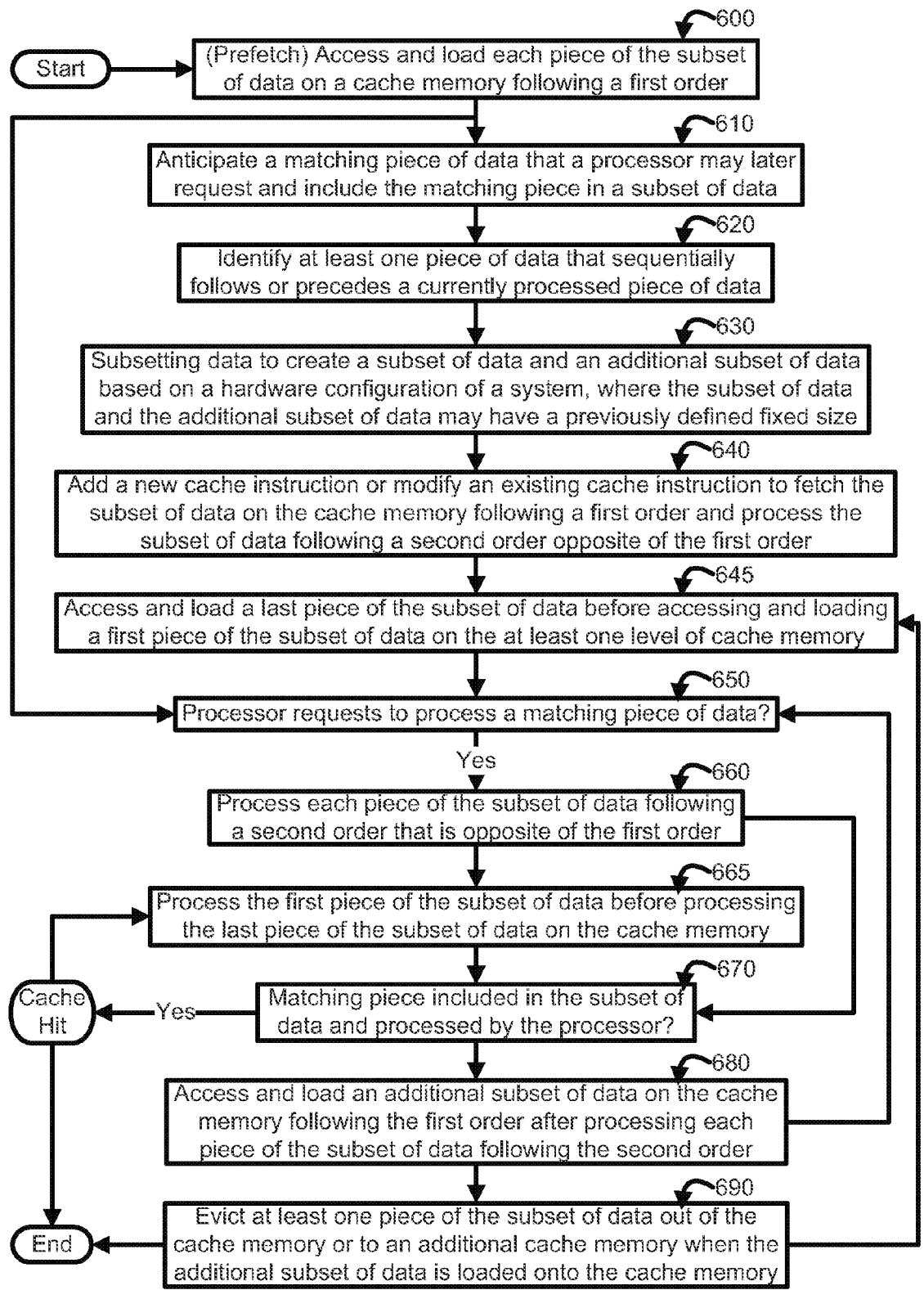
FIG. 6 is a flow chart illustrating a method for anticipating matching piece of data that a processor may later request, creating at least one subset of data, accessing and loading a subset of data following a reverse order, and processing the subset of data following a forward order according to an embodiment of the invention.

FIG. 6 is a flow chart illustrating a method for anticipating a matching piece of data that a processor may later request, creating at least one subset of data, accessing and loading a subset of data following a reverse order, and processing the subset of data following a forward order according to an embodiment of the invention. The method of FIG. 6 may utilize a processor, a memory coupled to the processor, data, at least one level of cache memory, and a cache hit management application. The method of FIG. 6 may utilize additional components and/or devices in addition to and/or in lieu of those noted above and illustrated in FIG. 1.

As noted above, the cache hit management application may initially prefetch a subset of data by accessing and loading each piece of the subset of data on a cache memory following a first order 600. In prefetching the subset of data, the cache hit management application may anticipate a matching piece of data that a processor may later request and include the matching piece in the subset of data to be access and loaded 610. In one embodiment, the cache hit management application may anticipate that the matching piece of data may be a piece of data that sequentially follow or precede a currently processed piece of data 620. The cache hit management application may then subset data to create a subset of data and an additional subset of data based on a hardware configuration of a system including the matching piece of data 630. As noted above, the subset of data and the additional subset of data may have a previously defined fixed size based on a hardware configuration of the system.

After creating at least one subset of data, the cache hit management application may add a new cache instruction or modify an existing cache instruction to fetch the subset of data on the cache memory following a first direction or order and process the subset of data following a second direction or order that is opposite of the first order 640. As noted above, the cache hit management application may add or modify a cache instruction on a compiler on the system or the cache hit management application may be the compiler. The first order may include accessing and loading a last piece of the subset of data before accessing and loading a first piece of the subset of data on at least one level of cache memory 645.

The cache hit management application may then determine whether the processor has requested to process a matching piece of data 650. The cache hit management application may then proceed to process each piece of the subset of data following a second order that is opposite of the first order 660. As noted above, the second order may include processing the first piece of the subset of data before processing the last piece of the subset of data on the cache memory 665.

The cache hit management application may then determine whether a matching piece is included in the subset of data and processed by the processor 670. If the matching piece of data was included in the subset of data and was processed by the processor then a cache hit has occurred. It may be assumed that if the matching piece of data was processed from at least one level of cache memory then the matching piece of data was included in the subset of data since at least one level of cache was populated with pieces of the subset. The cache hit management application may then continue to process each additional piece on the subset of data for additional cache hits. After processing each piece of the subset of data following the second order, the cache hit management application may proceed to access and load an additional subset of data on the cache memory following the first order 680. As noted above a replacement policy may be utilized by the compiler to evict at least one piece of the subset of data out of the cache memory or to an additional cache memory when the additional subset of data is loaded onto the cache memory 690.

The process may then be complete or cache hit management application may proceed to anticipate additional matching pieces of data that the processor will later request, prefetch a subset of data following a first order, process the subset of data following a second order, and repeat the method disclosed in FIG. 6. The method of FIG. 6 may include additional steps in addition to and/or in lieu of those depicted in FIG. 6.

What is claimed is:

1. A method for managing cache hits comprising:
    subsetting data to create subsets of the data and, after the subsetting, loading a first of the subsets of data on at least one level of cache memory of a processor following a first order, the first subset including pieces of data loaded into the at least one level of cache memory according to the first order;
    wherein the data is subsetted based on a fixed size defined by a user; and
    in response to a request from the processor for a matching piece of data, processing the pieces of data of the first subset following a second order that is opposite of the first order, to identify the matching piece of data in the first subset stored on the at least one level of cache memory.

2. The method for managing cache hits of claim 1 wherein following the first order includes accessing and loading a last piece of the first subset of data before accessing and loading a first piece of the first subset of data on the at least one level of cache memory.

3. The method for managing cache hits of claim 2 wherein following the second order includes processing the first piece of the first subset of data before processing the last piece of the first subset of data on the at least one level of cache memory.

4. The method for managing cache hits of claim 1 further comprising accessing and loading a second of the subsets of data on the at least one level of cache memory following the first order after processing each piece of the first subset of data following the second order.

5. The method for managing cache hits of claim 1 wherein the first subset of data includes a linear data structure or a non-linear data structure.

6. The method for managing cache hits of claim 1 wherein each of the subsets of data has a previously defined fixed size.

7. The method for managing cache hits of claim 1, wherein the at least one level of cache memory includes plural levels of cache memory, and wherein loading the first subset of data on the plural levels of cache memory comprises:
    loading, in the first order, a portion of the pieces of data of the first subset onto a first of the plural levels of cache memory;
    in response to the first level of cache memory becoming full, evicting at least one piece of data of the portion from the first level of cache memory to a second of the plural levels of cache memory; and
    after the evicting, continuing to load a further portion of the pieces of data of the first subset onto the first level of cache memory.

8. The method for managing cache hits of claim 7, wherein the processing comprises:
    first processing the pieces of data in the first level of cache memory to find the matching piece of data; and
    in response to not finding the matching piece of data in the first level of cache memory, processing the pieces of data in the second level of cache memory.

9. A system comprising:
a processor with at least one level of cache memory; and
a cache hit management application executable from a computer readable medium to:
subset data to create plural subsets of the data;
wherein the data is subsetted based on a fixed size defined by a user;
after the subsetting, prefetch each piece of a first of the subsets of data onto the at least one level of cache memory following a first order;
in response to a request for a matching piece of data, process each piece of the first subset of data on the at least one level of cache memory with the processor following a second order that is opposite of the first order; and
determine whether a cache hit has occurred;
wherein the cache hit has occurred when the processor identifies the matching piece of data in the at least one level of cache memory;
wherein a write policy is utilized that concurrently writes and stores onto main memory each piece of the first subset of data that was fetched onto the at least one level of cache memory if a cache miss occurs.

10. The system of claim 9 wherein the at least one level of cache memory includes plural levels of cache memory, wherein a first of the plural levels of cache memory: is closer to the processor than a second of the plural levels of cache memory, and includes a faster capacity memory than the second level of cache memory.

11. The system of claim 9 wherein prefetching each piece of the first subset of data onto the at least one level cache memory following the first order includes anticipating the matching piece of data that the processor may later request and including the matching piece in the first subset of data.

12. The system of claim 11 wherein prefetching each piece of the first subset of data onto the at least one level of cache memory following the first order further includes accessing and loading a last piece of the first subset of data onto the at least one level of cache memory before accessing and loading a first piece of the first subset of data onto the at least one level of cache memory.

13. The system of claim 12 wherein processing each piece of the first subset of data on the at least one level of cache memory following the second order includes processing the first piece of the first subset of data before processing the last piece of the first subset of data.

14. The system of claim 9, wherein the at least one level of cache memory includes plural level of cache memory, and wherein prefetching each piece of the first subset of data onto the plural levels of cache memory comprises:
loading, in the first order, a portion of the pieces of the first subset onto a first of the plural levels of cache memory;
in response to the first level of cache memory becoming full, evicting at least one piece of the portion from the first level of cache memory to a second of the plural levels of cache memory; and
after the evicting, continuing to load a further portion of the pieces of the first subset onto the first level of cache memory.

15. The system of claim 14, wherein the processing comprises:
first processing the pieces of the first subset in the first level of cache memory to find the matching piece of data; and
in response to not finding the matching piece of data in the first level of cache memory, processing the pieces of the first subset in the second level of cache memory.

16. A non-transitory computer readable medium comprising instructions that if executed by a processor cause a cache hit management application to:
anticipate a matching piece of data that a processor may later request to process;
subsetting data to create plural subsets of the data;
wherein the cache management application subsets the data based on a fixed size defined by a user;
after the subsetting, prefetch a first of the subsets of data by accessing and loading each piece of the first subset of data onto at least one level of cache memory of the processor following a reverse order;
in response to a request from the processor for the matching piece of data, process each piece of the first subset of data on the at least one level of cache memory following a forward order and indicate that a cache hit has been obtained when the matching piece of data is identified in the first subset of data on the at least one level of cache memory.

17. The non-transitory computer readable medium of claim 16 wherein the cache hit management application is to add a new cache control instruction to prefetch the first subset of data on the at least one level of cache memory following the reverse order and to process the first subset of data following the forward order.

18. The non-transitory computer readable medium of claim 16 wherein the cache hit management application is further to modify an existing cache control instruction to prefetch the first subset of data on the at least one level of cache memory following the reverse order and to process the first subset of data following the forward order.

19. The non-transitory computer readable medium of claim 16, wherein the at least one level of cache memory includes plural levels of cache memory, and wherein loading each piece of the first subset of data onto the plural levels of cache memory comprises:
loading, in the reverse order, a portion of the pieces of the first subset onto a first of the plural levels of cache memory;
in response to the first level of cache memory becoming full, evicting at least one piece of the portion from the first level of cache memory to a second of the plural levels of cache memory; and
after the evicting, continuing to load a further portion of the pieces of the first subset onto the first level of cache memory.

20. The non-transitory computer readable medium of claim 19, wherein the processing comprises:
first processing the pieces of the first subset in the first level of cache memory to find the matching piece of data; and
in response to not finding the matching piece of data in the first level of cache memory, processing the pieces of the first subset in the second level of cache memory.

* * * * *